US012002333B2

(12) United States Patent
Espino

(10) Patent No.: US 12,002,333 B2
(45) Date of Patent: Jun. 4, 2024

(54) BACCARAT GAMING METHODS AND SYSTEMS

(71) Applicant: DK CROWN HOLDINGS INC., Boston, MA (US)

(72) Inventor: Angel Espino, Westminster, CO (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 18/202,216

(22) Filed: May 25, 2023

(65) Prior Publication Data

US 2023/0298439 A1 Sep. 21, 2023

Related U.S. Application Data

(63) Continuation of application No. 17/404,821, filed on Aug. 17, 2021, now Pat. No. 11,694,521, which is a continuation of application No. 16/734,295, filed on Jan. 3, 2020, now Pat. No. 11,094,173, which is a continuation-in-part of application No. 16/655,226, filed on Oct. 16, 2019, now abandoned.

(60) Provisional application No. 62/746,445, filed on Oct. 16, 2018.

(51) Int. Cl.
*G07F 17/32* (2006.01)

(52) U.S. Cl.
CPC ...... *G07F 17/3293* (2013.01); *G07F 17/3244* (2013.01); *G07F 17/3267* (2013.01)

(58) Field of Classification Search
CPC ............. G07F 17/3293; G07F 17/3244; G07F 17/3267
USPC ................................................ 463/11, 12, 13
See application file for complete search history.

(56) References Cited

U.S. PATENT DOCUMENTS

| | | | | |
|---|---|---|---|---|
| 2011/0269529 | A1* | 11/2011 | Baerlocher | G07F 17/3262 463/25 |
| 2013/0084933 | A1* | 4/2013 | Amaitis | G07F 17/3276 463/16 |
| 2015/0339884 | A1* | 11/2015 | Chun | G07F 17/3244 463/25 |
| 2016/0351018 | A1* | 12/2016 | Reeves | G07F 17/3293 |
| 2019/0035220 | A1* | 1/2019 | deWaal | G07F 17/3227 |
| 2019/0188959 | A1* | 6/2019 | Lutnick | G07F 17/3225 |
| 2020/0160666 | A1* | 5/2020 | Lutnick | G07F 17/34 |
| 2020/0302744 | A1* | 9/2020 | Lutnick | G07F 17/3293 |

OTHER PUBLICATIONS

Non-Final Office Action on U.S. Appl. No. 17/404,821 dated Jul. 27, 2022.
Notice of Allowance on U.S. Appl. No. 17/404,821 dated Feb. 16, 2023.

* cited by examiner

*Primary Examiner* — Pierre E Elisca
(74) *Attorney, Agent, or Firm* — Foley & Lardner LLP

(57) ABSTRACT

Systems and methods for providing a wagering game associated with the game of Baccarat which includes generating game outcomes for one to N games in a single game session.

20 Claims, 8 Drawing Sheets

BACCARAT GAMING METHODS AND SYSTEMS

BACKGROUND OF THE INVENTION

Field of the Invention

The present invention relates to the field of gaming, particularly to the field of wagering games involving real or virtual playing cards, and more particularly to secondary wagering games which are associated with underlying wagering games, such as baccarat.

Background of the Art

Baccarat is a popular game that is played in most casino environments. It may take the form of a card table game, played with a shoe of cards that is typically an aggregation of several randomly-ordered standard decks of fifty-two physical playing cards, or it can be simulated as an electronic table game or an online game.

The object of the game of Baccarat is for the bettor to successfully wager on whether the Bank's hand or the Player's hand is going to win. The bettor receives even money for his wager if he selects the winning hand and loses his wager if he selects the losing hand. Because of the rules of play of Baccarat and more particularly the pre-established draw rules, the Bank's hand has a slightly higher chance of winning than does the Player's hand. The winning frequency for the Bank's hand has been determined to be 0.45859 (45.859%) whereas the winning frequency for the Player hand is 0.44624 (44.624%) with the remainder of the outcomes being ties. Therefore, if the bettor wagers on the Bank's hand and the Bank hand wins, the bettor must pay to the gaming establishment a commission (typically, 5%) of the amount the bettor wins. No commission is paid if the bettor successfully wagers on the Player's hand.

As used in this specification, the term "Conventional Manner of Play of Baccarat" is as follows:

A multiple number of decks of standard playing cards, 52 in number, are used; typically eight decks, or 416 playing cards, are shuffled together and placed in a shoe from which the cards are dealt during the play of the game.

Each bettor makes a wager on whether the Bank's hand or the Player's hand will win. After all wagers are made, two cards are dealt from the shoe to the Bank position and two cards are dealt from the shoe to the Player position on the table layout. The cards are turned face up and the value of the Bank hand the Player hand is determined, modulo ten.

Aces count one; Kings, Queens, Jacks and Tens count zero and the other cards count their respective face value. The suits (Spades, Hearts, Diamonds and Clubs) have no meaning in Baccarat.

The highest hand value in Baccarat is nine. All hand values range from a low of zero to a high of nine. If when the cards are added together, the total of the hand exceeds nine, then the hand value is determined modulo ten. For example, a seven and an eight total fifteen, but the hand value is five. An Ace and a nine total ten, but the hand value is zero.

A two card total of eight or nine is called a "natural"; a two card total of zero is called a "baccarat." As will be explained below, in certain situations in the play of the game, a third card will be dealt. The value of this third card is added to the total of the first two cards and a new hand value is established. Again, if the new hand total exceeds nine, the hand value is determined by subtracting ten from the total of the hand.

Prior to the deal, each better can make one of three wagers: 1) that the Bank hand will win; 2) that the Player hand will win; or 3) that the Bank hand and the Player hand will tie. Wagering locations are provided on the Baccarat table layout. Whichever of the Bank hand or the Player hand is closest to a total on nine is the winner.

All winning Bank hand wagers are paid off at odds of one-to-one and the house charges a five percent (5%) commission on the amount won by the bettor. For example, if a bettor wagers $100 on the Banker hand and the Banker hand wins, the bettor wins $100 and is charged a $5 commission on the amount that the bettor won.

All winning Player hand wagers are paid off at odds of one-to-one and the bettor is not charged any commission on the amount of his winnings or his wager because the house, by virtue of the third card draw rules, has a statistical advantage over the player of 45.859-44.624 or 1.235% which is the vigorish ("vig") of the house on player wagers. Winning wagers on the Tie hand bet are paid off at odds of nine-to-one or eight-to-one (depending on the gaming establishment) and the bettor is not charged any commission on the amount of his winnings or his wager since there is already a statistical advantage in favor of the house on tie wagers. If a Tie hand occurs, all wagers on the Bank hand and all wagers on the Player hand are "pushes" and the amount wagered is returned to the bettor.

Depending on the point total of the Player's hand and the Banker's hand, an additional card may be dealt to the Player's hand, the Banker's hand, or both. The rules for determining whether a third card is dealt are fixed rules, there is no discretion for either the Player's hand or the Banker's hand on whether a third card is dealt.

If either the Player hand or the Banker hand has a point total of eight or nine on the first two cards, no third card is dealt to either hand and the hand with the highest point total is the winner (or the hand is a Tie, as the case may be). If neither the Player hand nor the Banker hand has a point total of eight or nine, then there is a possibility of a third card draw.

The third card draw rules are as follows:

Rule #1: If the initial two card Player hand has a point total of 0, 1, 2, 3, 4 or 5, the Player hand draws a third card. If the initial two card Player hand has a point total of 6 or 7, the Player hand stands and does not receive a third card.

Rule #2: If the Player hand stands and does not draw a third card, then the Banker hand follows Rule #1. In other words, if the Player hand has a point total of 6 or 7, the Bank hand draws a third card on a point total of 0, 1, 2, 3, 4 or 5 and the Bank hand stands on a point total of 6 or 7.

Rule #3: If the Player hand draws a third card, the Bank hand must draw or stand as follows:

TABLE 1

| BACCARAT RULES | |
|---|---|
| PLAYER | |
| HAVING TWO CARD TOTAL OF | |
| 1-2-3-4-5-10 | DRAWS A CARD |
| 6-7 | STANDS |
| 8-9 | TURNS CARDS OVER |

TABLE 1-continued

| BANKER | | |
|---|---|---|
| HAVING TWO CARD TOTAL OF | DRAWS WHEN GIVING OR PLAYER'S THIRD CARD DRAW IS AN | DOES NOT DRAW WHEN GIVING OR PLAYER'S THIRD CARD DRAW IS AN |
| 0, 1, 2 | ALWAYS DRAWS | |
| 3 | 1-2-3-4-5-6-7-9-10 | 8 |
| 4 | 2-3-4-5-6-7 | 1-8-9-10 |
| 5 | 4-5-6-7 | 1-2-3-8-9-10 |
| 6 | 6-7 | 1-2-3-4-5-8-9-10 |
| 7 | STANDS | |
| 8-9 | TURNS CARDS OVER | |

At the end of each hand, winning wagers are paid and losing wagers are collected by the house. Any commission due to the house is marked in commission boxes in the center of the table. Gaming chips are used to represent the amount of money owed by each bettor to the house for the commissions. In order not to slow down the game, the commission is not actually collected from each bettor until the end of the round determined by all of the cards in the shoe being dealt down to the plastic cut card, usually approximately eighty hands.

The mathematical analysis of the game reveals that the 5% commission is what gives the house its advantage on wagers on the Banker hand and allows the gaming establishment to make a profit from providing the Baccarat game to the bettors. Because the rules for standing and drawing third cards are automatic, the mathematical analysis shows that the Bank hand will win 45.859% of the hands, the Player hand will win 44.624% of the hands and the Tie hand will occur 9.517% of the hands. If the Tie hands are disregarded because they do not affect any Player or Bank wagers, it is then determined that the Bank hand will win 50.7% of the time and the Player hand will win 49.3% of the time.

Because the Bank hand wins more than 50% of the hands (disregarding the Tie hands that do not affect any Player or Bank wagers), if a bettor always bet on the Bank hand, the bettor would have an advantage over the gaming establishment. By charging a 5% commission on all Bank hand wins, the gaming establishment compensates for the percentage of winning Bank hands being slightly over 50%.

After figuring in the 5% commission that must be paid by bettors on winning Bank hands, the gaming establishment has approximately a 1.23% advantage over the bettor when the bettor wagers on the Player hand and the gaming establishment has a 1.057% advantage over the bettor when the bettor wagers on the Bank hand. The Tie hand wager gives the gaming establishment a 4.88% advantage over the bettor when the payoff odds are nine-to-one and a 14.1% advantage over the bettor when the payoff odds are eight-to-one.

While baccarat is a very popular game, many new games which are quickly rising in popularity provide numerous wagering opportunities, thus increasing player participation and excitement. Consequently, further variations of existing wagering games are always of interest to players and casino operators, and therefore, there is a desire for systems and methods which would increase wagering in the game of baccarat.

SUMMARY OF THE INVENTION

The invention is generated directed to systems and methods for providing a wagering game associated with the game of Baccarat, comprising the steps of: a) receiving one or more wagers for participation in a game session, each wager being associated with one or more game outcomes of one to N games in the game session, wherein each of the outcomes in the one to N games include one of a player hand rank outranking a banker hand rank, a banker hand rank outranking a player hand rank, and a player hand rank being the same as the banker hand rank; b) randomly generating game data for forming a player hand and a banker hand for a first of the one to N games during the game session, wherein each of the one to N games includes the randomly generated game data for the first game; c) determining a player hand rank and a banker hand rank for each of the one to N games during the game session; d) comparing the player hand rank and banker hand rank to determine a game outcome for each game of the one to N games; e) settling the wager received for each of the one to N games based on the game outcome determined by one of awarding a payout responsive to the wager received being associated with an outcome that matches the determined outcome for the one to N games in the game session and collecting the wager responsive to the wagering received being associated with an outcome that differs from the determined outcome for the one to N games in the game session; and f) repeating steps b) through e) N times.

In some embodiments of the aforementioned systems and methods, N is at least three.

In some embodiments of the aforementioned systems and methods the game data comprises one or more playing cards distributed to each of a player hand and a banker hand for each game of the one to N games during the game session.

In some embodiments of the aforementioned systems and methods the game data comprises a one or more playing cards distributed to a player hand and a banker hand randomly generated by a processing device operatively associated with a random number generator.

In some embodiments, the aforementioned systems and methods further comprises the step of discarding the game data randomly generated for each of the one to N games after the first game.

BRIEF DESCRIPTION OF THE DRAWINGS

While the disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION OF SOME EMBODIMENTS OF THE INVENTION

Figure 1:
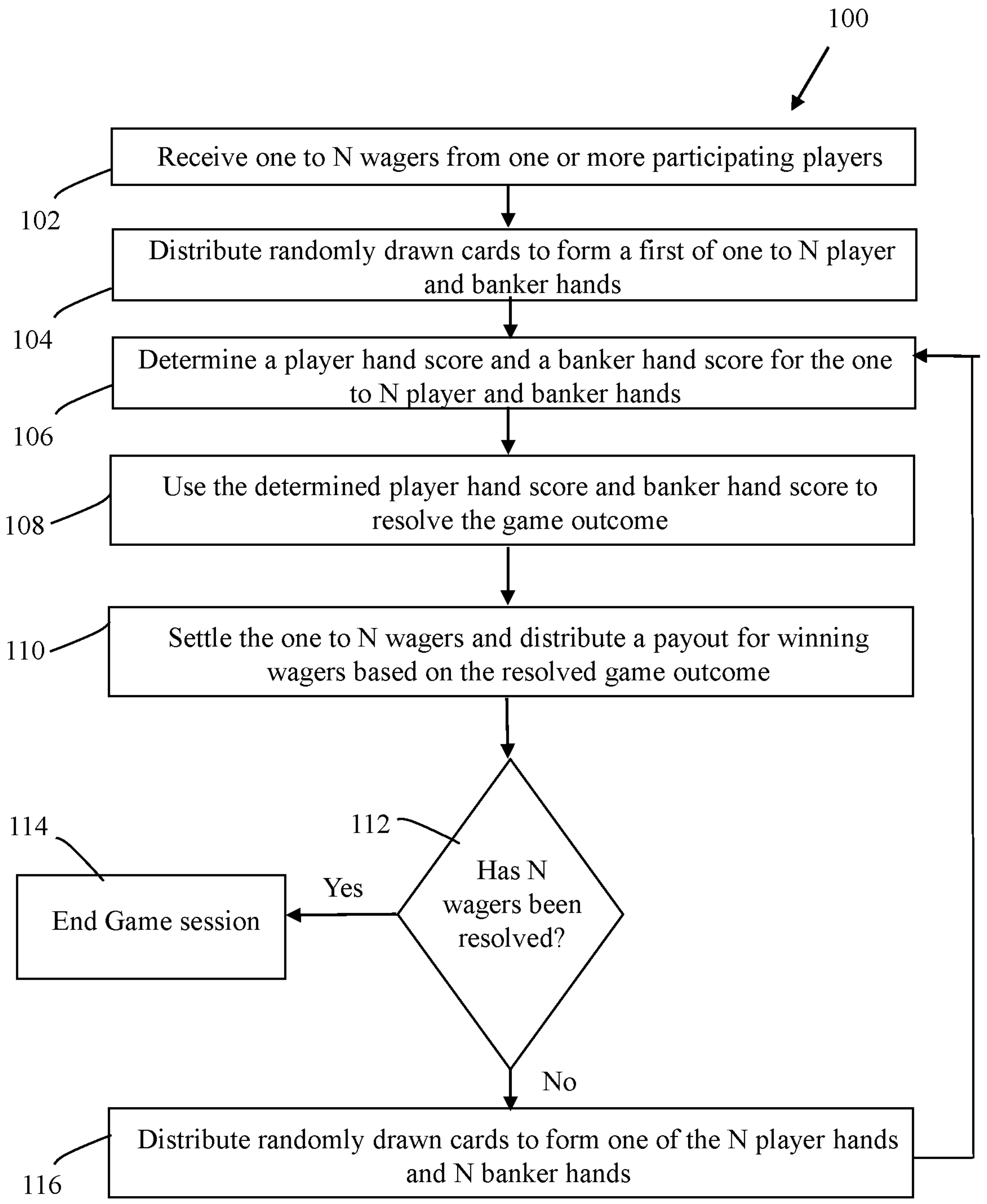
FIG. 1 is a process flow chart depicting an exemplary wagering game method of the invention which is configured and constructed according to some embodiments of the invention.

It should be understood that the methods and steps recited herein may be partially or wholly carried out in a variety of ways, such as by a dealer physically using game elements in a casino, via an electronic gaming machine (EGM) in a gaming establishment, through a computer or portable device, such as a mobile phone, capable of communicating via the Internet, global telecommunication network or world wide web. It should further be understood that the methods and systems of the invention are described herein in connection with standard playing cards for illustrative purposes only, as the methods and systems of the invention may be used with non-standard playing cards or any other items with varying distinguishable symbols.

The terms "gaming," "gambling," or the like, refer to activities, games, sessions, rounds, hands, rolls, operations, and other events related to wagering games, the outcome of which is at least partially based on one or more random events ("chance" or "chances"), and on which wagers may be placed by a player. In addition, the words "wager," "bet," "bid," or the like, refer to any type of wager, bet, or gaming venture that is placed on random events, whether of monetary or non-monetary value. Points, credits, and other items of value may be purchased, earned, or otherwise issued prior to beginning the wagering game. In some embodiments, purchased points, credits, or other items of value may have an exchange rate that is not one-to-one to the currency used by the user. For example, a wager may include money, points, credits, symbols, or other items that may have some value related to a wagering game. Wagers may be placed in wagering games that involve the risk of real-world monetary value for the potential of payouts with real-world monetary value (e.g., the "play-for-pay," such as "house-banked," "player-banked," and "dividend refund" configurations, each of which is described in more detail below) or in wagering games that involve no real-world monetary risks for the player (e.g., the "play-for-fun" and "social play-for-fun" configurations described in more detail below).

As used herein, the term "wager" includes any form of wagering value, including money, casino chips, other physical means for payment, and online or remote electronic authorization of a wager in any acceptable form to the casino or online or virtual game host. Also included are physical representations of money (e.g., casino chips) at a local gaming establishment, as well as virtual representations of money in the form of electronic authorizations of a transfer of money and digital representations of money (e.g., digital representations of bills or coins, digital representations of chips, numerical quantities of money, numerical quantities of points, or numerical quantities of credits) at a local or remote electronic gaming device. As used herein, the term "wagering element" means and includes objects and symbols used to signify the acceptance of a wager. For example, physical wagering elements include physical money (e.g., bills and coins) and physical wagering tokens (e.g., poker chips), which may or may not be redeemable for monetary value and may or may not include electronic identifiers embedded within the tokens, enabling electronic sensing and tracking of wagering. Virtual wagering elements include, for example, images (e.g., images of money or poker chips) and text (e.g., a string of numbers), which may or may not be redeemable for monetary value. In the "play-for-fun" and "social play-for-fun" configurations, a "wager" may not have a cash value (i.e., a real-world monetary value).

For the purposes of this description, it will be understood that when an action related to accepting wagers, making payouts, dealing cards, selecting cards, or other actions associated with a player or a dealer is described herein, and such description includes a player or a dealer taking the action, the results of the action may be computer generated and may be displayed on a live or virtual table or electronic display, and, if applicable, the reception or detection of such an action in an electronic form where player and dealer choices, selections, or other actions are received at an electronic interface. This further includes the results of a virtual dealer and virtual players, where the actions described are actually generated by a computer (typically associated with an online game). By way of a further example, if dealing of a card is described herein, the description includes (but is not limited to) the following: the dealing of a card by a dealer from a deck, shuffler, shoe, or other card source and the reception or placement of the card at a table location associated with a player or reception directly by a player; the generation and transmission of an electronic indication or representation of a card from a game play source or server to an electronic receiver, where the receiver may be at a table (using virtual cards) including players and/or virtual players and/or a dealer or virtual dealer, on a gaming terminal, at a public display in a casino, at a remote location (e.g., using online or Internet game play), or at other locations. Also included is the representation of a card on a display or displays, and, if applicable to the action described, an electronic reception of an indication that the card has been received, selected, or otherwise interacted with at a location associated with a player, or, associated with a virtual player.

Referring to FIG. 1, a flowchart diagram of a method of improving gaming technology relating to the operation of an associated wagering game system in connection with the game of Baccarat as shown and generally referred to by the reference numeral 100, in which a single game may not be limited to a single game outcome determination, but rather is advantageously improved to generate multiple game outcome determinations in a single game session, such as N game outcome determinations, which, among other things, require less cards than N game outcome determinations, less time for game play, less game tables, less staff, increases wagering, as well as provides for opportunities for higher potential payouts and revenue generation in a single session.

Responsive to receiving from each player at least a game wager or just "wager" in step 102 on either the two hands, cards are distributed from a randomly-ordered group of one or more decks of cards to form the first of one to N player and banker hands in step 104. In this embodiment, from one to N wagers may be received in step 102, each of which corresponds with a determination and outcome of the one to N player and banker hands formed. Each wager from one to N is received by being positioned in a designated area of one to N designated areas of the gaming table surface, the wager being in the form of a physical implement representing a monetary amount and each designated area of the one to N designated areas representing a specific wagering selection of an outcome in one to N games.

It should be understood that receiving a wager typically also involves a player affirmatively engaging in an action that is interpreted to place a monetary amount at risk. By receiving the wager, a gaming operator or host is also placing some monetary amount at risk, which may be determined or expressed as being equal to, or a multiple of, the monetary amount which the player is placing at risk. The affirmative action of the player to place an amount at risk may include pressing a button or physically placing a gaming chip on a designated betting area on a table game felt layout, such as the game table surface 250 shown in FIG. 3. The game operator or host may receive the wager, thus indicating acceptance thereof, through a variety of actions, which may involve illumination of betting areas on a table or other displays, or by continuing to step 104 in which cards are distributed from a source of randomly-ordered playing cards, or virtual cards are randomly generated with the assistance of a random number generator, to form a first of one to N player hands and a first of one to N banker hands, each of which will be compared with one another to determine the outcome of one to N Baccarat games.

In the embodiment described herein, a specific wager selection is made for one or more of one to N games, in the form of a selection of a banker hand winning outcome, a player hand winning outcome, and a Tie outcome. Optional or mandatory side wagers, that is, wagers placed on the occurrence of outcomes other than the final game outcome during game play may also be received in step 102. For example, a wager on all N game outcomes being the same, such as all Player hand wins, all Banker hand wins, or all ties, may be received. Another example is a wager may be received on specific outcomes for each of the N games, which may be preset, such as at least two tie outcomes in N games, or alternatively, the specific outcomes may be selected by a player.

In step 106, a score is determined for each of the one to N player and banker hands based on the cards forming each hand. In step 108, the player hand score and banker hand score are used to resolve each of the one to N game outcomes, such as a player hand win, banker hand win or tie. In step 110, the wager associated with the one to N games is settled by comparison with the game outcome and any payout is distributed. As shown by step 112, if the N wager is settled in step 110, then the game session ends in step 114. As shown by step 112 and 116, if the N wager has not been settled in step 110, then one or more cards are randomly generated or dealt from a source of random cards and distributed to the one to N player and banker hands. Steps 106, 108, 110, 112 and 116 are repeated until all player and banker hand scores are determined for each of the one to N player and banker hands, all game outcomes are determined for each of the one to N games, all N wagers are resolved for the one to N games, and any payouts are distributed in connection with the one to N wagers.

In some embodiments, the one or more cards distributed to the one to N player and banker hands at step 116 are discarded before the next occurrence of step 116, such that each successive game of N games is determined by the cards in the player hand and banker hand in the first of N games (that is, the hands formed at step 104) plus the one or more cards distributed in step 116 for each of the N games.

It should be understood that the application of Baccarat rules to the associated game player and banker hands may involve conventional or non-conventional Baccarat rules, such as for example, the application may be of commission-based Baccarat or non-commission-based Baccarat. To illustrate, in Baccarat games modified to be no commission by paying out half the amount won on any winning banker hand of six, this modification would also be applied to the associated game hands, that is, a winning associated game banker hand of six would also pay half.

In some embodiments, N is equal to two, three or four. In some embodiments, the first of N game outcomes pays half of the amount wagered on banker hand winning outcomes where the banker hand score is six. In some embodiments, after the first of N games, each winning banker hand outcome of N game outcomes pays half of the amount wagered on banker hand winning outcomes in which the banker hand score is three.

Some embodiments of the invention are directed to a method of providing a Baccarat wagering game with associated wagering game with a player position in competition with a banker position, the player position and the banker position receiving playing cards from one or more decks of 52 playing cards, with eight decks, or 416 playing cards, being preferred, the method comprising: detecting placement of a Baccarat wager from one or more participants, the Baccarat wager relating to the player position beating the banker position at the conclusion of a round of game play, the banker position beating the player position at the conclusion of the round of game play, or a tie between the player position and the banker position at the conclusion of the round of game play; detecting placement of wagers relating to an associated wagering game, wherein each associated game wager is received by being positioned in a designated area of the gaming table surface, each associated game wager being in the form of a physical implement representing a monetary amount and each designated area representing a specific wagering action for an associated game banker hand winning outcome, an associated game player hand winning outcome, and an associated game Tie outcome; receiving game data from an instance of conducting the underlying game of Baccarat responsive to the player and banker hands being formed according to the rules of the Baccarat game, wherein the game data includes at least the final player hand score and the final banker hand score; distributing a single card to form an associated game player hand and a single card to form an associated game banker hand; determining an associated game player hand score and an associated game banker hand score, wherein the determination of the associated game player hand score is based on the application of the Baccarat game scoring rules to the final player hand score as may be modified by the single card distributed to form the associated game player hand, and the determination of the associated game banker hand score is based on the application of the Baccarat game scoring rules to the final banker hand score as may be modified by the single card distributed to form the associated game banker hand; and settling the associated game wagers received based on the application of Baccarat game rules for determining the winning hand to the associated game player hand score and the associated game banker hand score.

In some embodiments, there are N associated game wagers, wherein N is any number, such as two or three, and for each of N associated game wagers another single card is distributed to each of the player hand and banker hand, such that for an N of two, both the player hand and banker hand will each receive an associated game card, respectively, in addition to the original player hand and banker hand formed in the underlying baccarat game to determine the outcome of the first associated game wagers, and then receive another associated game card, respectively, to determine the outcome of the second associated game wagers.

In some embodiments, after each hand, one card is added to the prior hand in the associated game, whereas in other embodiments, the cards from the prior associated game are discarded and new cards are added to the underlying baccarat hand.

An exemplary embodiment is described below with non-limiting associated wagering game names.

In the exemplary embodiment, after adjudicating the standard Player, Banker, and Tie baccarat bets in the underlying game of Baccarat according to the rules of conventional baccarat, one more card shall be dealt to both the Player and Banker hands (Second Tier Betting Draw Cards). The dealer shall then score both hands the same way as in conventional baccarat. The Player Plus One, Banker Plus One, and Tie Plus One bets shall be adjudicated based on these new scores.

The Player Plus One and Banker Plus One bets shall pay even money, except on a winning total of three shall pay 1 to 2. The Tie Plus One bet shall pay 8 to 1.

After adjudicating the Player Plus One, Banker Plus One, and Tie Plus One bets, a second card shall be dealt to both the Player and Banker hands. The dealer shall then score both hands the same way as in conventional baccarat. The Player Plus Two, Banker Plus Two, and Tie Plus Two bets shall be adjudicated based on these new scores. The Player Plus Two and Banker Plus Two bets shall pay even money, except on a winning total of three shall pay 1 to 2. The Tie Plus Two bet shall pay 8 to 1.

The Player Trifecta bet shall win if the Player, Player Plus One, and Player Plus Two bets all won. It can pay either 5 or 6 to 1, according to some embodiments. The Banker Trifecta bet shall win if the Banker, Banker Plus One, and Banker Plus Two bets all won. It can pay either 5 or 6 to 1, according to some embodiments. The Tie Trifecta bet shall win if the Tie, Tie Plus One, and Tie Plus Two bets all won. Wins pay 400 to 1.

In some embodiments, another rule variant is to pay for any correct prediction of the winner at all three stages, including sequences that are not equal, like Player-Banker-Player.

In some embodiments the underlying game of Baccarat is conducted using physical playing cards drawn from a randomly ordered group of standard physical playing cards. In other embodiments, the underlying game of Baccarat is conducted by using a random number generator mapped to simulate one or more decks of randomized standard physical playing cards.

In some embodiments the collection of the wager comprises physically removing the implement received from the designated area on the gaming table surface, and the distribution of a payout to the player comprises placing physical implements representing monetary amounts in the designated area of the gaming table surface.

Some embodiments of the invention are directed to systems for providing the above methods, which may include one or more data communication devices, display devices, and processing devices, which may be local or remote, as necessary to provide these methods on any computerized or partially computerized platforms, online or through a local or global communication network, including mobile devices, home computers, single or multiplayer electronic gaming machines enabling play with virtual or real currency and/or virtual or real playing cards, devices or kiosks for enabling wagering on the play of a live Baccarat game.

Some embodiments of the invention are also directed to a non-transitory machine readable media for providing a wagering game associated with an underlying game of Baccarat including one or more software programs, code and/or data segments as necessary to provide any of the methods described herein on one or more machines.

It should be understood that the words "wager," "wagering," "betting" or "bet," or the like, refers to any type of points, money, credits, items of value, including physical or virtual representations thereof, which are placed at stake in that they may be forfeit depending on the occurrence of machine-generated randomly generated outcomes, such as outcomes which may be provided by revealing physical playing cards drawn from one or more decks or groups of randomly-ordered physical playing cards or a random number generator for randomly generating numbers which can be mapped to identify playing card results.

Various platforms are contemplated that are suitable for implementation of embodiments of wagering games according to this disclosure. For example, embodiments of wagering games may be implemented as live table games with an in-person dealer, electronic gaming machines, partially or fully automated table games, and fully automated, network-administered games (e.g., Internet games) that either produce game results utilizing a processor, or produce a live video feed of a dealer administering a game from a remote studio.

As previously noted, any of the present methods and games may be played as a live casino game, as a hybrid casino game (with real or virtual cards), on a multi-player electronic platform, on a personal computer for practice, on a hand-held game for practice, on a legally-authorized site on the Internet, or on a play-for-fun site on the Internet, or through any other communication network.

For example, in one embodiment, the players may be remotely located from a live dealer, and a live dealer and a game table may be displayed to players on their monitors via a video feed. The players' video feeds may be transmitted to the dealer and may also be shared among the players at the table. In a sample embodiment, a central station may include a plurality of betting-type game devices and an electronic camera for each game device. A plurality of player stations, remotely located with respect to the central station, may each include a monitor, for displaying a selected game device at the central station, and input means, for selecting a game device and for placing a bet by a player at the player's station relating to an action involving an element of chance to occur at the selected game device.

Figure 2:
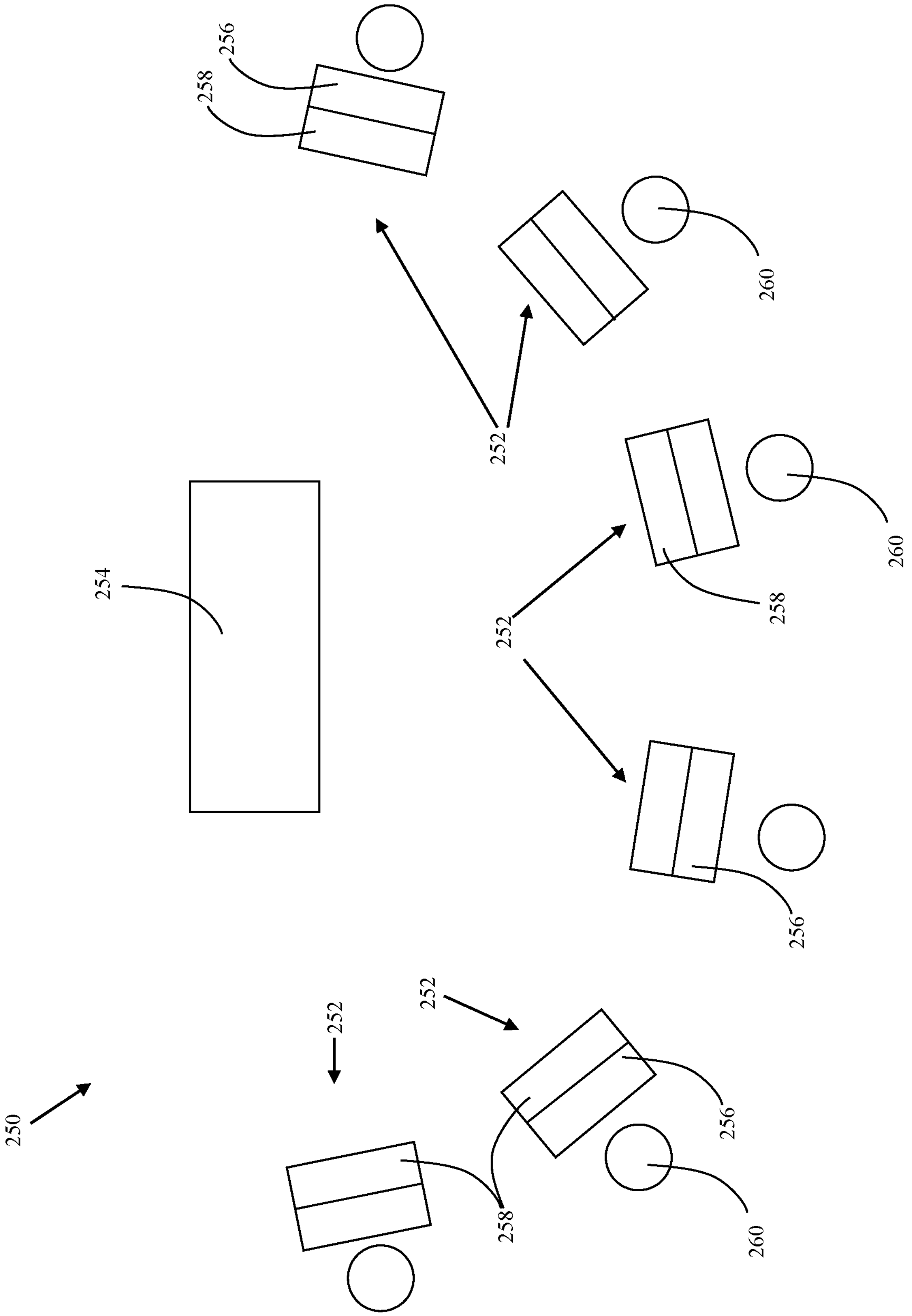
FIG. 2 is a diagram of a playing surface for implementation of a method of administering a wagering game according to some embodiments of this invention.

FIG. 2 provides a diagram of a playing surface for implementation of the wagering games within the scope of the present disclosure. The gaming table surface 250 (also referred to herein as a "playing device layout") is provided by the administrator and may include multiple player areas 252 (e.g., six player areas 252 are shown on surface 250). The gaming table surface 250 may be provided with a card placement area 254 for generally displaying the player and banker hands.

Each player area 252 includes a player hand wager area 256 and a banker hand wager area 258. Wagering areas for a tie are shown in associated wagering areas 260. Each area 252, 254 and 256 includes portions or divisions for each game of the one to N games as discussed above. These portions or divisions are not shown but may be designated numerically corresponding to each game of the one to N games. For example, if N is three, then each area 252, 254 and 256 may be divided into three areas with designations corresponding to games one, two and three. In administering a round of the wagering game, wagers are received by being placed in their respective wager area, with wager areas being left exposed if no respective wager is received. The wager areas for the associated wagering game are shown on of wagers that have been retained may be removed by the administrator (e.g., dealer). Gaming table surface 250 may also display paytables and other game information. The outcome of any wagers placed in wager areas 256, 258 and 260 may be determined as described herein, such as via method 100 provided in FIG. 1.

Figure 3:
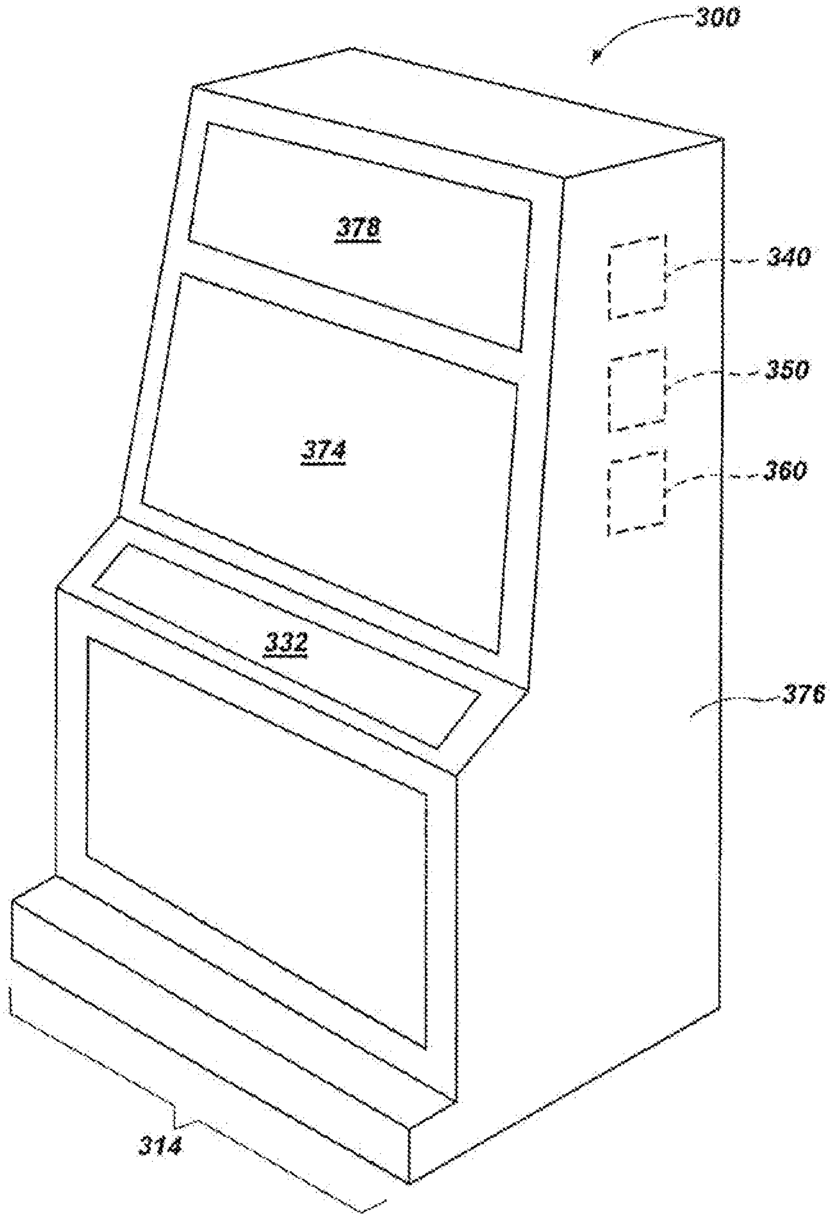
FIG. 3 is a perspective view of an individual electronic gaming device configured for implementation of embodiments of wagering games in accordance with this disclosure.

FIG. 3 is a perspective view of an individual electronic gaming device 300 (e.g., an electronic gaming machine (EGM)) configured for implementing wagering games according to this disclosure. The individual electronic gaming device 300 may include an individual player position 314 including a player input area 332 configured to enable a player to interact with the individual electronic gaming device 300 through various input devices (e.g., buttons, levers, touchscreens). The individual electronic gaming device 300 may include a gaming screen 374 configured to display indicia for interacting with the individual electronic gaming device 300, such as through processing one or more programs stored in memory 340 to implement the rules of game play at the individual electronic gaming device 300. Accordingly, game play may be accommodated without involving physical playing cards, chips or other wagering elements, and live personnel. The action may instead be simulated by a control processor 350 operably coupled to the memory 340 and interacting with and controlling the individual electronic gaming device 300.

Although the individual electronic gaming device 300 displayed in FIG. 3 has an outline of a traditional gaming cabinet, the individual electronic gaming device 300 may be implemented in other ways, such as, for example, client software downloaded to a portable device, such as a smart phone, tablet, or laptop computer. The individual electronic gaming device 300 may also be a non-portable personal computer (e.g., a desktop or all-in-one computer) or other computing device. In some embodiments, client software is not downloaded but is native to the device or is otherwise delivered with the device when distributed.

A communication device 360 may be included and operably coupled to the processor 350 such that information related to operation of the individual electronic gaming device 300, information related to the game play, or combinations thereof may be communicated between the individual electronic gaming device 300 and other devices such as a server through a suitable communication medium, such, as, for example, wired networks, Wi-Fi networks, and cellular communication networks.

The gaming screen 374 may be carried by a generally vertically extending cabinet 376 of the individual electronic gaming device 300. The individual electronic gaming device 300 may further include banners to communicate rules of game play and the like, such as along a top portion 378 of the cabinet 376 of the individual electronic gaming device 300. The individual electronic gaming device 300 may further include additional decorative lights (not shown), and speakers (not shown) for transmitting and optionally receiving sounds during game play.

Some embodiments may be implemented at locations including a plurality of player stations. Such player stations may include an electronic display screen for display of game information according to the invention (e.g., cards, wagers, and game instructions) and for accepting wagers and facilitating credit balance adjustments. Such player stations may, optionally, be integrated in a table format, may be distributed throughout a casino or other gaming site, or may include both grouped and distributed player stations.

Figure 4:
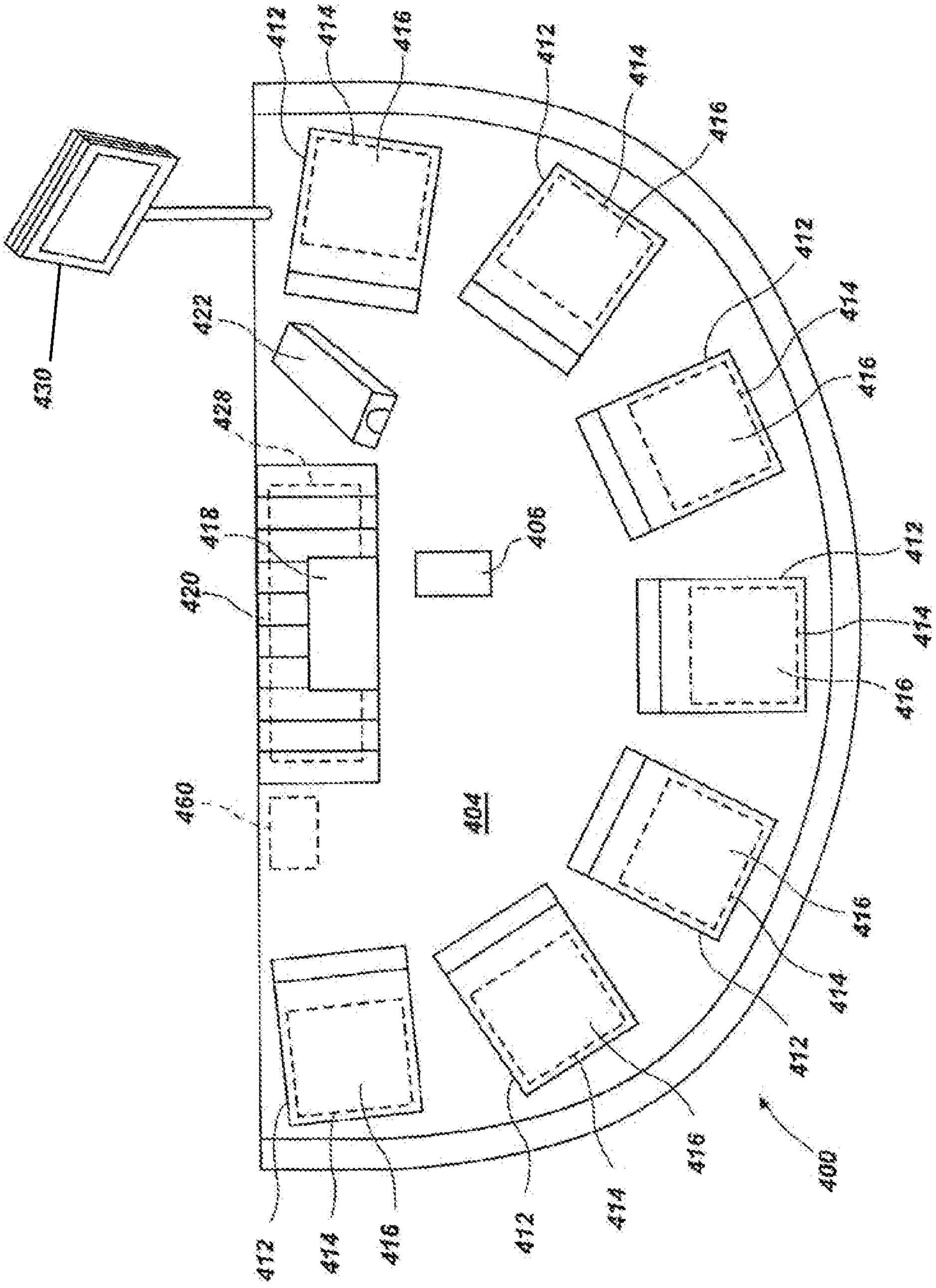
FIG. 4 is a top view of a table configured for implementation of embodiments of wagering games in accordance with this disclosure.

FIG. 4 is a top view of a suitable table 400 configured for implementing wagering games according to this disclosure. The table 400 may include a playing surface 404. The table 400 may include player stations 412. Each player station 412 may include a player interface 416, which may be used for displaying game information (e.g., game instructions, input options, wager information, game outcomes, etc., and accepting player elections). The player interface 416 may be a display screen in the form of a touch screen, which may be at least substantially flush with the playing surface 404 in some embodiments. Each player interface 416 may be operated by its own local game processor 414 (shown in dashed lines), although, in some embodiments, a central game processor 428 (shown in dashed lines) may be employed and may communicate directly with player interfaces 416. In some embodiments, a combination of individual local game processors 414 and the central game processor 428 may be employed.

A communication device 460 may be included and may be operably coupled to one or more of the local game processors 414, the central game processor 428, or combinations thereof, such that information related to operation of the table 400, information related to the game play, or combinations thereof may be communicated between the table 400 and other devices through a suitable communication medium, such as, for example, wired networks, Wi-Fi networks, and cellular communication networks.

Table 400 may further include additional features, such as a dealer chip tray 420, which may be used by the dealer to cash players in and out of the wagering game, whereas wagers and balance adjustments during game play may be performed using, for example, virtual chips (e.g., images or text representing wagers). For embodiments using physical cards, the table 400 may further include a card-handling device 422 (which may be configured to shuffle, read, and deliver physical cards for the dealer and players to use during game play or, alternatively, a card shoe configured to read and deliver cards that have already been randomized) and a designated area for physical cards 406, which may include multiple locations for all of the respective banker and player hands, and associated player and banker hands. For embodiments using virtual cards, the virtual cards may be displayed at the individual player interfaces 416.

The table 400 may further include a dealer interface 418, which, like the player interfaces 416, may include touch screen controls for receiving dealer inputs and for assisting the dealer in administering the wagering game. The table 400 may further include an upright display 430 configured to display images that depict game information such as pay tables, hand counts, historical win/loss information by player, and a wide variety of other information considered useful to the players.

Although an embodiment is described showing individual discrete player stations, in some embodiments, the entire playing surface 404 may be an electronic display that is logically partitioned to permit game play from a plurality of players for receiving inputs from, and displaying game information to, the players, the dealer, or both.

Figure 5:
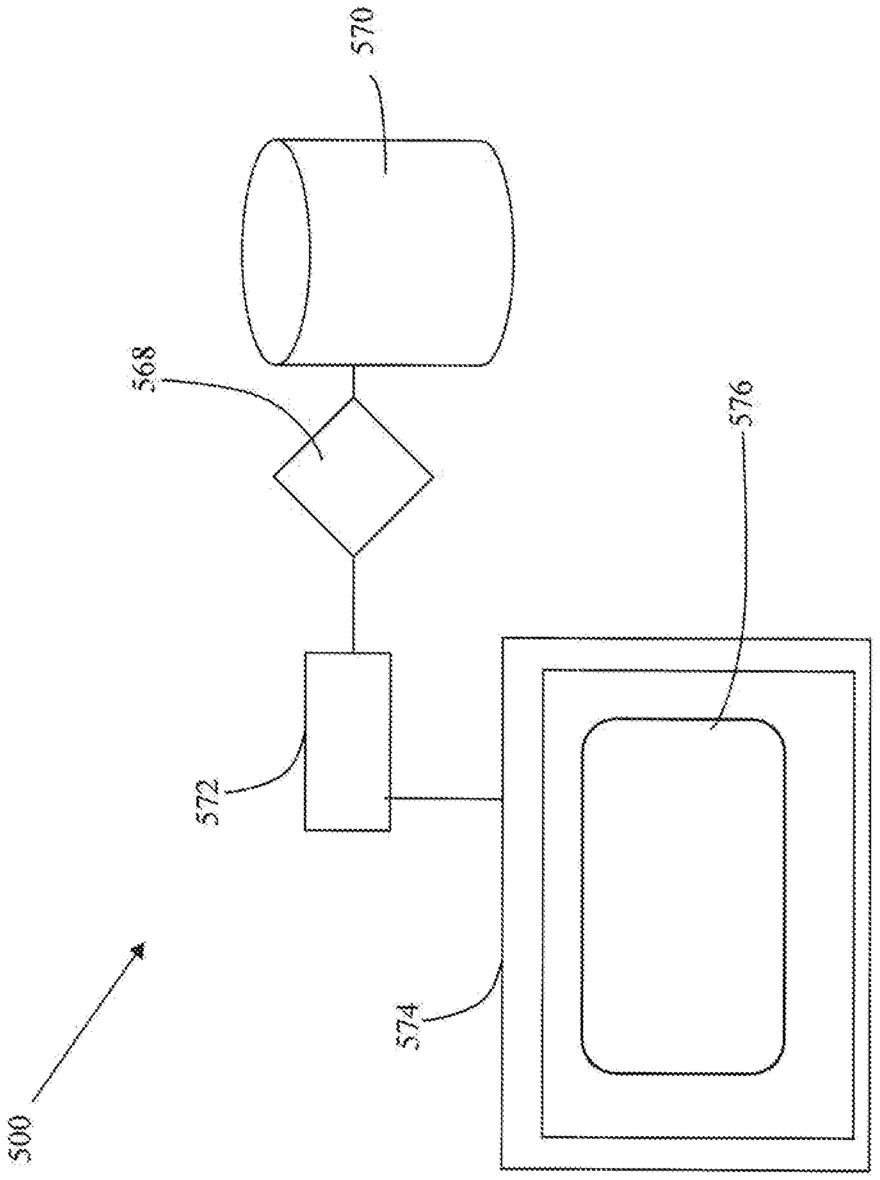
FIG. 5 is a schematic diagram depicting the components of an exemplary system configured and constructed according to some embodiments of the invention.

FIG. 5 illustrates a diagram of an exemplary system 500, which may be a portable device, constructed in accordance with some embodiments of the invention. System 500 includes processing device 568 in communication with a database or memory device 570, communication or data input/output device 572 and a display device 574. In some embodiments, display device 574 is a touch-enabled device and includes a data input device component. Memory device 570 may include data relating to the underlying game and embodiments of the invention as described herein, such as the side wager criteria. A player interface 576 can be presented on display device 574. Player interface 576 may be a virtual representation of a game table layout and/or one or more player positions 252 for facilitating the transmittal and receipt of wagers in accordance with any of the embodiments herein, such as method 100. Game outcomes are displayed and wagers are tracked using display device 574 and processing device 568 compares the respective player and banker hands, including the associated hands as described above and any bonus criteria, and determines an outcome and payout to be displayed on display device 574 accordingly.

Figure 6:
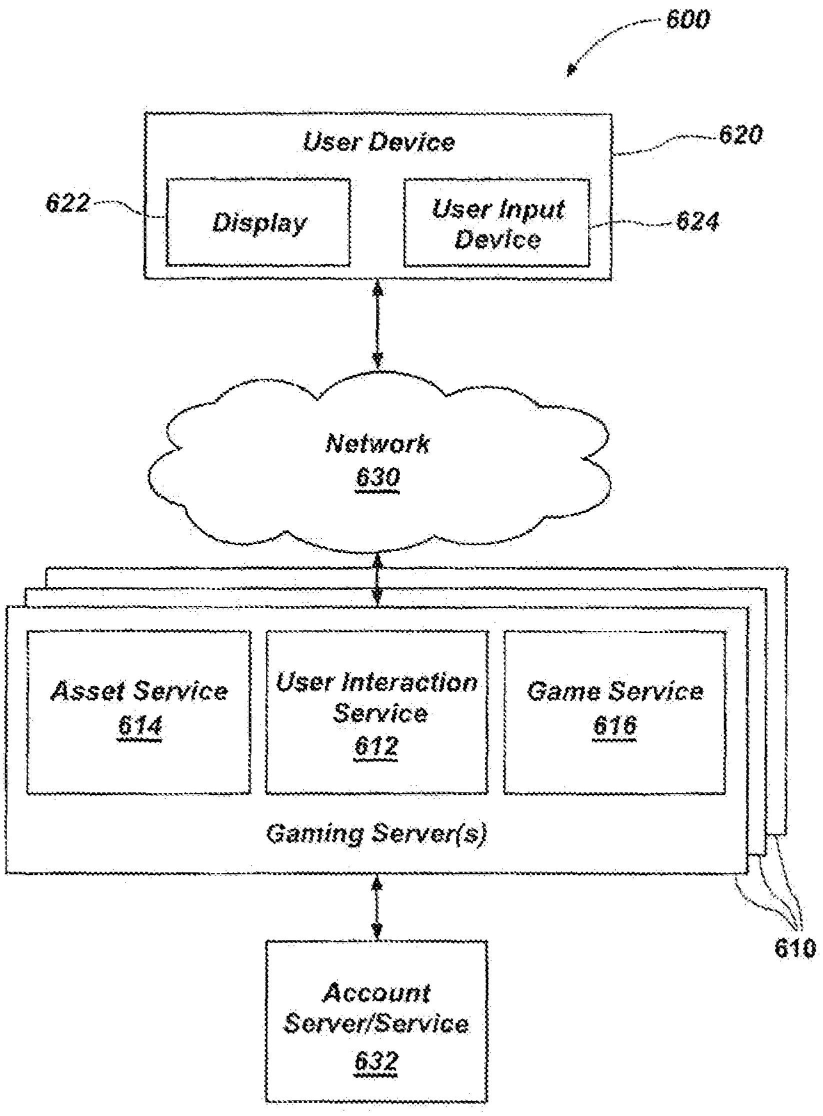
FIG. 6 is a schematic block diagram of a gaming system for implementing embodiments of waging games in accordance with this disclosure.

In some embodiments, wagering games in accordance with this disclosure may be administered using a gaming system employing a client-server architecture (e.g., over the Internet, a local area network, etc.). FIG. 6 is a schematic block diagram of an exemplary gaming system 600 for implementing wagering games so that end users may remotely access games as described herein, among others.

The wagering games of the invention supported by the gaming system 600 may be operated with real currency or with virtual credits or other virtual (e.g., electronic) value indicia. For example, the real currency option may be used with traditional casino and lottery-type wagering games in which money or other items of value are wagered and may be cashed out at the end of a game session. The virtual credits option may be used with wagering games in which credits (or other symbols) may be issued to a player to be used for the wagers. A player may be credited with credits in any way allowed, including, but not limited to, a player purchasing credits; being awarded credits as part of a contest or a win event in this or another game (including non-wagering games); being awarded credits as a reward for use of a product, casino, or other enterprise, time played in one session, or games played; or may be as simple as being awarded virtual credits upon logging in at a particular time or with a particular frequency, etc. Although credits may be won or lost, the ability of the player to cash out credits may be controlled or prevented. In one example, credits acquired (e.g., purchased or awarded) for use in a play-for-fun game may be limited to non-monetary redemption items, awards, or credits usable in the future or for another game or gaming session. The same credit redemption restrictions may be applied to some or all of credits won in a wagering game as well.

An additional variation includes web-based sites having both play-for-fun and wagering games, including issuance of free (non-monetary) credits usable to play the play-for-fun games. This feature may attract players to the site and to the games before they engage in wagering. In some embodiments, a limited number of free or promotional credits may be issued to entice players to play the games. Another method of issuing credits includes issuing free credits in exchange for identifying friends who may want to play. In another embodiment, additional credits may be issued after a period of time has elapsed to encourage the player to resume playing the game. The gaming system 600 may enable players to buy additional game credits to allow the player to resume play. Objects of value may be awarded to play-for-fun players, which may or may not be in a direct exchange for credits. For example, a prize may be awarded or won for a highest scoring play-for-fun player during a defined time interval. All variations of credit redemption are contemplated, as desired by game designers and game hosts (the person or entity controlling the hosting systems).

The gaming system 600 may include a gaming platform to establish a portal for an end user to access a wagering game hosted by one or more gaming servers 610 over a network 630. In embodiments, games are accessed through a user interaction service 612. The gaming system 600 enables players to interact with a user device 620 through a user input device 624 and a display 622 and to communicate with one or more gaming servers 610 using a network 630 (e.g., the Internet). Typically the user device is remote from the gaming server 610 and the network is the word-wide web (i.e., internet).

In some embodiments, the gaming servers 610 may be configured as a single server to administer wagering games in combination with the user device 620. In other embodiments, the gaming servers 610 may be configured as separate servers for performing separate, dedicated functions associated with administering wagering games. Accordingly, the following description also discusses "services" with the understanding that the various services may be performed by different servers or combinations of servers in different embodiments. As shown in FIG. 6, the gaming servers 610 may include a user interaction service 612, a game service 616, and an asset service 614. In some embodiments, one or more of the gaming servers 610 may communicate with an account server 632 performing an account service 632. As explained more fully below, for some wagering type games, the account service 632 may be separate and operated by a different entity than the gaming servers 610; however, in some embodiments the account service 632 may also be operated one or more of the gaming servers 610.

The user device 620 may communicate with the user interaction service 612 through the network 630. The user interaction service 612 may communicate with the game service 616 and provide game information to the user device 620. In some embodiments, the game service 616 may also include a game engine. The game engine may comprise game rules. In some embodiments, a single user device 620 communicates with a game provided by the game service 616, while other embodiments may include a plurality of user devices 620 configured to communicate and provide end users with access to the same game provided by the game service 616. In addition, a plurality of end users may be permitted to access a single user interaction service 612, or a plurality of user interaction services 612, to access the game service 616. The user interaction service 612 may enable a user to create and access a user account and interact with game service 616. The user interaction service 612 may enable users to initiate new games, join existing games, and interface with games being played by the user.

The user interaction service 612 may also provide a client for execution on the user device 620 for accessing the gaming servers 610. The client provided by the gaming servers 610 for execution on the user device 620 may be any of a variety of implementations depending on the user device 620 and method of communication with the gaming servers 610. In one embodiment, the user device 620 may connect to the gaming servers 610 using a web browser, and the client may execute within a browser window or frame of the web browser. In another embodiment, the client may be a stand-alone executable on the user device 620.

For example, the client may comprise a relatively small amount of script, also referred to as a "script driver," including scripting language that controls an interface of the client. The script driver may include simple function calls requesting information from the gaming servers 610. In other words, the script driver stored in the client may merely include calls to functions that are externally defined by, and executed by, the gaming servers 610. As a result, the client may be characterized as a "thin client." The client may simply send requests to the gaming servers 610 rather than performing logic itself. The client may receive player inputs, and the player inputs may be passed to the gaming servers 610 for processing and executing the wagering game. In some embodiments, this may involve providing specific graphical display information for the display 622 as well as game outcomes.

As another example, the client may comprise an executable file rather than a script. The client may do more local processing than does a script driver, such as calculating where to show what game symbols upon receiving a game outcome from the game service 616 through user interaction service 612. In some embodiments, portions of an asset service 614 may be loaded onto the client and may be used by the client in processing and updating graphical displays. Some form of data protection, such as end-to-end encryption, may be used when data is transported over the network 630. The network 630 may be any network, such as, for example, the Internet or a local area network.

The gaming servers 610 may include an asset service 614, which may host various media assets (e.g., text, audio, video, and image files) to send to the user device 620 for presenting the various wagering games to the end user. In other words, the assets presented to the end user may be stored separately from the user device 620. For example, the user device 620 requests the assets appropriate for the game played by the user; as another example, especially relating to thin clients, just those assets that are needed for a particular display event will be sent by the gaming servers 610, including as few as one asset. The user device 620 may call a function defined at the user interaction service 612 or asset service 614, which may determine which assets are to be delivered to the user device 620 as well as how the assets are to be presented by the user device 620 to the end user. Different assets may correspond to the various user devices 620 and their clients that may have access to the game service 616 and to different variations of wagering games.

The gaming servers 610 may include the game service 616, which may be programmed to administer wagering games and determine game play outcomes to provide to the user interaction service 612 for transmission to the user device 620. For example, the game service 616 may include game rules for one or more wagering games, such that the game service 616 controls some or all of the game flow for a selected wagering game as well as the determined game outcomes. The game service 616 may include pay tables and other game logic. The game service 616 may perform random number generation for determining random game elements of the wagering game. In one embodiment, the game service 616 may be separated from the user interaction service 612 by a firewall or other method of preventing unauthorized access to the game service 612 by the general members of the network 630.

The user device 620 may present a gaming interface to the player and communicate the user interaction from the user input device 624 to the gaming servers 610. The user device 620 may be any electronic system capable of displaying gaming information, receiving user input, and communicating the user input to the gaming servers 610. For example, the user device 620 may be a desktop computer, a laptop, a tablet computer, a set-top box, a mobile device (e.g., a smartphone), a kiosk, a terminal, or another computing device. As a specific, non-limiting example, the user device 620 operating the client may be an interactive electronic gaming system 300 (see FIG. 3) or portable system 500 (see FIG. 5), as described above. The client may be a specialized application or may be executed within a generalized application capable of interpreting instructions from an interactive gaming system, such as a web browser.

The client may interface with an end user through a web page or an application that runs on a device including, but not limited to, a smartphone, a tablet, or a general computer, or the client may be any other computer program configurable to access the gaming servers 610. The client may be illustrated within a casino webpage (or other interface) indicating that the client is embedded into a webpage, which is supported by a web browser executing on the user device 620.

In some embodiments, components of the gaming system 600 may be operated by different entities. For example, the user device 620 may be operated by a third party, such as a casino or an individual, that links to the gaming servers 610, which may be operated, for example, by a wagering game service provider. Therefore, in some embodiments, the user device 620 and client may be operated by a different administrator than the operator of the game service 616. In other words, the user device 620 may be part of a third-party system that does not administer or otherwise control the gaming servers 610 or game service 616. In other embodiments, the user interaction service 612 and asset service 614 may be operated by a third-party system. For example, a gaming entity (e.g., a casino) may operate the user interaction service 612, user device 620, or combination thereof to provide its customers access to game content managed by a different entity that may control the game service 616, amongst other functionality. In still other embodiments, all functions may be operated by the same administrator. For example, a gaming entity may elect to perform each of these functions in-house, such as providing access to the user device 620, delivering the actual game content, and administering the gaming system 600.

The gaming servers 610 may communicate with one or more external account servers 632 (also referred to herein as an account service 632), optionally through another firewall. For example, the gaming servers 610 may not directly accept wagers or issue payouts. That is, the gaming servers 610 may facilitate online casino gaming but may not be part of a self-contained online casino itself. Another entity (e.g., a casino or any account holder or financial system of record) may operate and maintain its external account service 632 to accept bets and make payout distributions. The gaming servers 610 may communicate with the account service 632 to verify the existence of funds for wagering and to instruct the account service 632 to execute debits and credits. As another example, the gaming servers 610 may directly accept bets and make payout distributions, such as in the case where an administrator of the gaming servers 610 operates as a casino.

Additional features may be supported by the gaming servers 610, such as hacking and cheating detection, data storage and archival, metrics generation, messages generation, output formatting for different end user devices, as well as other features and operations.

Figure 7:
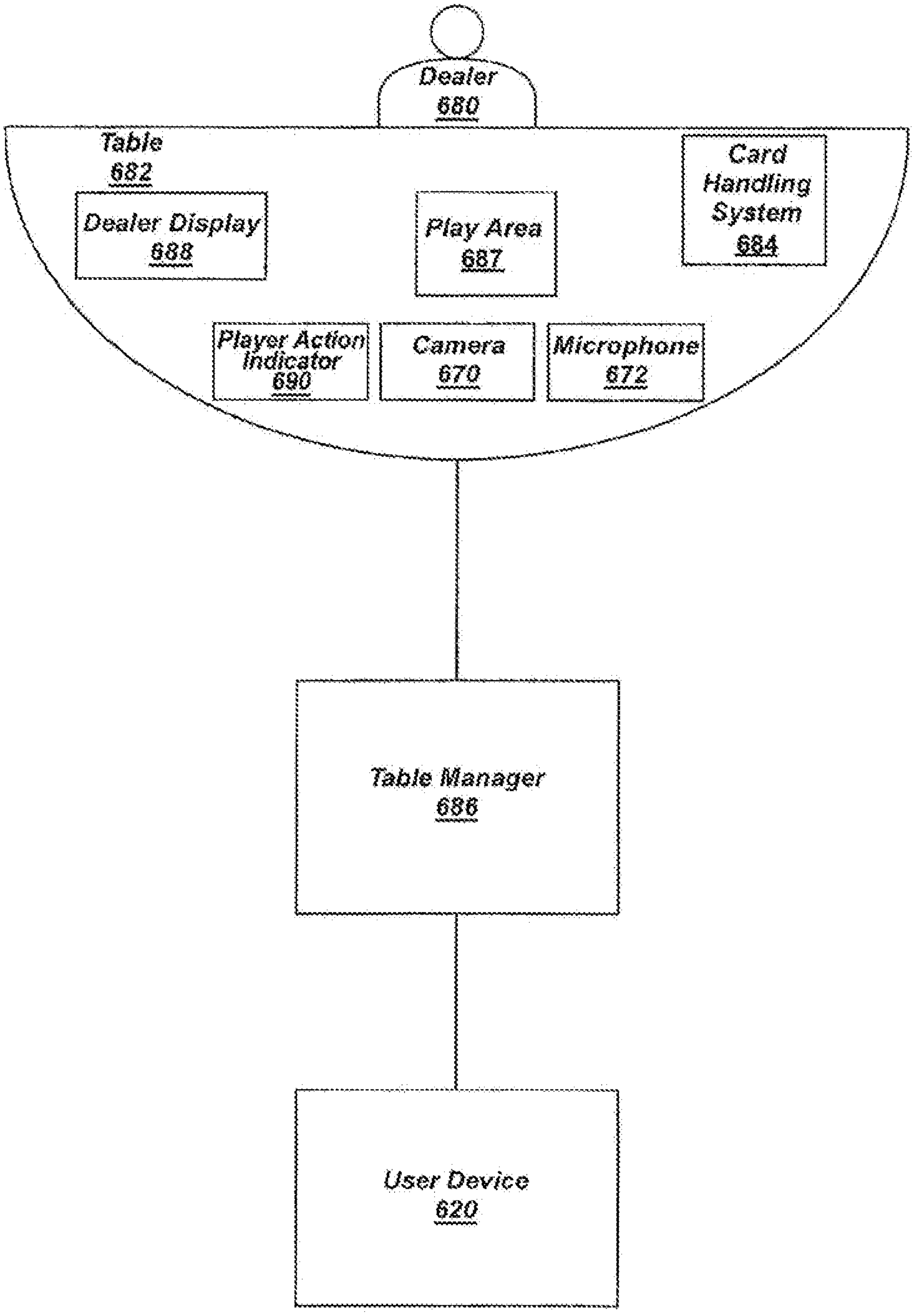
FIG. 7 is a schematic block diagram of a gaming system for implementing embodiments of wagering games including a live dealer feed.

FIG. 7 is a schematic block diagram of a table 682 for implementing wagering games including a live dealer feed. Features of the gaming system 600 described above in connection with FIG. 6 may be utilized in connection with this embodiment, except as further described. Rather than cards being determined by a computerized random processes, physical cards (e.g., from a standard, 52-card deck of playing cards) may be dealt by a live dealer 680 at a table 682 from a card handling system 684. A table manager 686 may assist the dealer 680 in facilitating play of the game by transmitting a video feed of the dealer's actions to the user device 620 and transmitting player elections to the dealer 680. As described above, the table manager 686 may act as or communicate with a gaming system 600 itself or as an intermediate client interposed between and operationally connected to the user device 620 and the gaming system 600 to provide gaming at the table 682 to users of the gaming system 600. Thus, the table manager 686 may communicate with the user device 620 through network 630, and may be a part of a larger online casino, or may be operated as a separate system facilitating game play. In various embodiments, each table 682 may be managed by an individual table manager 686 constituting a gaming device, which may receive and process information relating to that table. For simplicity of description, these functions are described as being performed by the table manager 686, though certain functions may be performed by an intermediary gaming system 600, such as the one shown and described in connection with FIG. 7. In some embodiments, the gaming system 600 may match remotely located players to tables 682 and facilitate transfer of information between user devices 620 and tables 682, such as wagering amounts and player option elections, without managing gameplay at individual tables. In other embodiments, functions of the table manager 686 may be incorporated into a gaming system 600.

The table 682 includes a camera 670 and optionally a microphone 672 to capture video and audio feeds relating to the table 682. The camera 670 may be trained on the dealer 680, play area 687, and card handling system 684. As the game is administered by the dealer 680, the video feed captured by the camera 670 may be shown to the player using the user device 620, and any audio captured by the microphone 672 may be played to the player using the user device 620. In some embodiments, the user device 620 may also include a camera, microphone, or both, which may also capture feeds to be shared with the dealer 680 and other players. In some embodiments, the camera 670 may be trained to capture images of the card faces, chips, and chip stacks on the surface of the gaming table and perform card recognition routines to identify the card rank and suit, which is well known in the art.

Card and wager data in some embodiments may be used by the table manger 686 to determine game outcome. The data extracted from the camera 670 may be used to confirm the card data obtained from the card handling system 684, to determine a player position that received a card, and for general security monitoring purposes.

The live video feed permits the dealer to show cards dealt by the card handling system and play the game as though the player were at a live casino. In addition, the dealer can prompt a user by announcing a player's election is to be performed. In embodiments in which a microphone 672 is included, the dealer 680 can verbally announce action or request an election by a player. In some embodiments, the user device 620 also includes a camera or microphone, which also captures feeds to be shared with the dealer 680 and other players.

The play area 687 may depict a player positions for playing the game. As determined by the rules of the game, the player at the user device 620 may be presented options for responding to an event in the game using a client as described with reference to FIG. 6.

Player selections may be transmitted to the table manager 686, which may display player elections to the dealer 680 using a dealer display 688 and player action indicator 690 on the table 682. For example, the dealer display 688 may display information regarding where to deal the next card or which player position is responsible for the next action.

In some embodiments, the table manager 686 may receive card information from the card handling system 684 to identify cards dealt by the card handling system 684. For example, the card handling system 684 may include a card reader to determine card information from the cards. The card information may include the rank and suit of each dealt card, and/or hand information.

The table manager 686 may apply game rules to the card information, along with the accepted player decisions, to determine gameplay events and wager results. Alternatively, the wager results may be determined by the dealer 680 and input to the table manager 686, which may be used to confirm automatically determined results by the gaming system.

Figure 8:
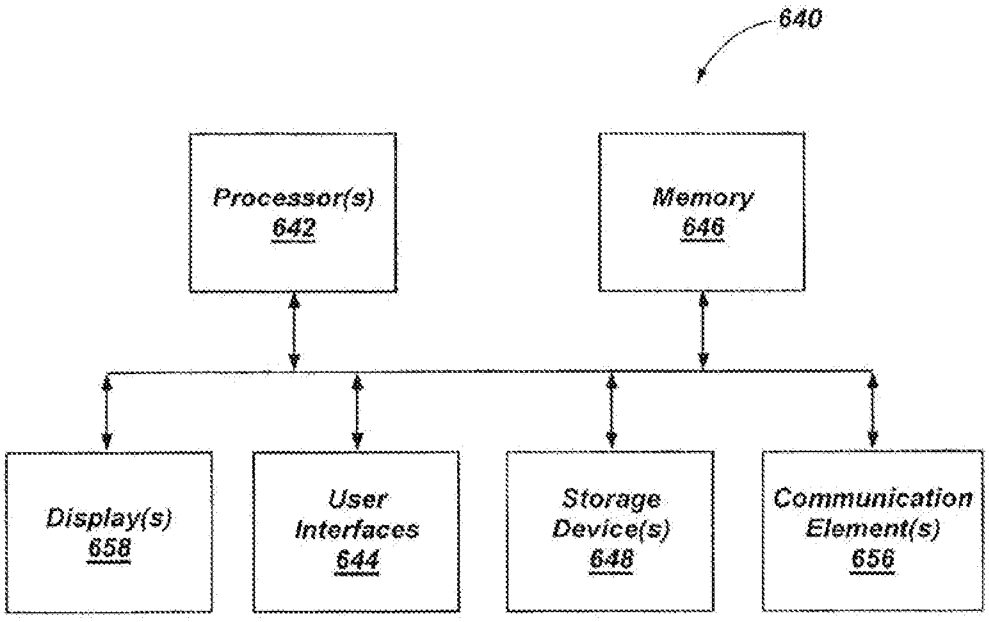
FIG. 8 is a block diagram of a computer for acting as a gaming system for implementing embodiments of wagering games in accordance with this disclosure.

FIG. 8 is a simplified block diagram showing elements of computing devices that may be used in systems and apparatuses of this disclosure. The computing system 640 may be a user-type computer, a file server, a computer server, a notebook computer, a tablet, a handheld device, a mobile device, or other similar computer system for executing software. The computing system 640 may be configured to execute software programs containing computing instructions and may include one or more processors 642, memory 646, one or more displays 658, one or more user interface elements 644, one or more communication elements 656, and one or more storage devices 648 (also referred to herein simply as storage 648).

The processors 642 may be configured to execute a wide variety of operating systems and applications including the computing instructions for administering wagering games of the present disclosure.

The memory 646 may be used to hold computing instructions, data, and other information for performing a wide variety of tasks including administering wagering games of the present disclosure. By way of example, and not limitation, the memory 646 may include Synchronous Random Access Memory (SRAM), Dynamic RAM (DRAM), Read-Only Memory (ROM), Flash memory, and the like.

The display 658 may be a wide variety of displays such as, for example, light emitting diode displays, liquid crystal displays, cathode ray tubes, and the like. In addition, the display 658 may be configured with a touch-screen feature for accepting user input as a user interface element 644.

As non-limiting examples, the user interface elements 644 may include elements such as displays, keyboards, push buttons, mice, joysticks, haptic devices, microphones, speakers, cameras, and touchscreens.

As non-limiting examples, the communication elements 656 may be configured for communicating with other devices or communication networks. As non-limiting examples, the communication elements 656 may include elements for communicating on wired and wireless communication media, such as for example, serial ports, parallel ports, Ethernet connections, universal serial bus (USB) connections, IEEE 1394 ("firewire") connections, Thunderbolt™ connections, Bluetooth® wireless networks, ZigBee wireless networks, 802.11 type wireless networks, cellular telephone/data networks, and other suitable communication interfaces and protocols.

The storage 648 may be used for storing relatively large amounts of nonvolatile information for use in the computing system 640 and may be configured as one or more storage devices. By way of example, and not limitation, these storage devices may include computer-readable media (CRM). This CRM may include, but is not limited to, magnetic and optical storage devices such as disk drives, magnetic tape, CDs (compact discs), DVDs (digital versatile discs or digital video discs), and semiconductor devices such as RAM, DRAM, ROM, EPROM, Flash memory, and other equivalent storage devices.

A person of ordinary skill in the art will recognize that the computing system 640 may be configured in many different ways with different types of interconnecting buses between the various elements. Moreover, the various elements may be subdivided physically, functionally, or a combination thereof. As one non-limiting example, the memory 646 may be divided into cache memory, graphics memory, and main memory. Each of these memories may communicate directly or indirectly with the one or more processors 642 on separate buses, partially-combined buses, or a common bus.

Some portions of the disclosure are presented in terms of algorithms (e.g., as represented in flowcharts, prose descriptions, or both) and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality. However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for the purposes of enablement and best mode.

Those skilled in the art will appreciate that the types of software and hardware used are not vital to the full implementation of the methods of the invention. The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention and also to enable any person skilled in the art to practice the invention, including making and using any devices or systems and performing any incorporated methods. The patentable scope of the invention may include other examples that occur to those skilled in the art. Other aspects and features of the invention can be obtained from a study of the drawings and the disclosure. The invention may be practiced otherwise than as specifically described herein. It should also be noted, that the steps and/or functions listed herein, notwithstanding the order of which steps and/or functions are listed, are not limited to any specific order of operation.

Those skilled in the art will readily appreciate that the systems and methods described herein may be a standalone system, gaming device, gaming machine or incorporated in an existing gaming system or machine. The system and gaming device of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein, in the claims and any equivalents thereto.

The invention claimed is:

1. A method, comprising:

receiving, by one or more processors coupled to memory, from a client device executing a client application, a request to initiate a game session comprising one or more plays of Baccarat, the request comprising one or more wagers and one or more corresponding outcomes of the game session;

responsive to the request to initiate the game session, for each play of the one or more plays in the game session:

providing, by the one or more processors, for presentation in the client application, a set of graphical elements representing a player hand and a banker hand for the play;

determining, by the one or more processors, an outcome for the play based on the player hand and the banker hand; and adjusting, by the one or more processors, a credit balance associated with the client application based on at least one of the one or more wagers, at least one of the one or more corresponding outcomes, and the outcome for the play.

2. The method of claim 1, wherein the game session comprises at least three plays of Baccarat.

3. The method of claim 1, further comprising randomly discarding, by the one or more processors, game data of the one or more plays following a first play of the one or more plays.

4. The method of claim 1, wherein at least one of the player hand or the banker hand are generated based on an output of a random number generator.

5. The method of claim 1, further comprising generating, by the one or more processors, for display in the client application, a set of second graphical elements indicating at least one outcome of the game session.

6. The method of claim 1, wherein the request comprises a respective wager for each of the one or more plays.

7. The method of claim 1, further comprising updating, by the one or more processors, at least one of the player hand or the banker hand during the play responsive to determining that the play satisfies an additional card condition.

8. The method of claim 1, further comprising determining, by the one or more processors, a player hand score for the player hand and a banker hand score for the banker hand.

9. A system, comprising:

one or more processors coupled to memory, the one or more processors configured to:

receive, from a client device executing a client application, a request to initiate a game session comprising one or more plays of Baccarat, the request comprising one or more wagers and one or more corresponding outcomes of the game session;

responsive to the request to initiate the game session, for each play of the one or more plays in the game session:

provide, for presentation in the client application, a set of graphical elements representing a player hand and a banker hand for the play;

determine an outcome for the play based on the player hand and the banker hand; and adjust a credit balance associated with the client application based on at least one of the one or more wagers, at least one of the one or more corresponding outcomes, and the outcome for the play.

10. The system of claim 9, wherein the game session comprises at least three plays of Baccarat.

11. The system of claim 9, wherein the one or more processors are further configured to randomly discard game data of the one or more plays following a first play of the one or more plays.

12. The system of claim 9, wherein at least one of the player hand or the banker hand are generated based on an output of a random number generator.

13. The system of claim 9, wherein the one or more processors are further configured to generate, for display in the client application, a set of second graphical elements indicating at least one outcome of the game session.

14. The system of claim 9, wherein the request comprises a respective wager for each of the one or more plays.

15. The system of claim 9, wherein the one or more processors are further configured to update at least one of the player hand or the banker hand during the play responsive to determining that the play satisfies an additional card condition.

16. The system of claim 9, wherein the one or more processors are further configured to determine player hand score for the player hand and a banker hand score for the banker hand.

17. A non-transitory computer-readable medium with instructions embodied thereon, the instructions, when executed by one or more processors, causing the one or more processors to perform operations comprising:

receiving, from a client device executing a client application, a request to initiate a game session comprising one or more plays of Baccarat, the request comprising one or more wagers and one or more corresponding outcomes of the game session;

responsive to the request to initiate the game session, for each play of the one or more plays in the game session:

providing, for presentation in the client application, a set of graphical elements representing a player hand and a banker hand for the play;

determining an outcome for the play based on the player hand and the banker hand; and adjusting a credit balance associated with the client application based on at least one of the one or more wagers, at least one of the one or more corresponding outcomes, and the outcome for the play.

18. The non-transitory computer-readable medium of claim 17, wherein the game session comprises at least three plays of Baccarat.

19. The non-transitory computer-readable medium of claim 17, further comprising randomly discarding, by the one or more processors, game data of the one or more plays following a first play of the one or more plays.

20. The non-transitory computer-readable medium of claim 17, wherein at least one of the player hand or the banker hand are generated based on an output of a random number generator.

* * * * *